Oct. 26, 1937.    K. J. TOBIN    2,097,424
TRACKS FOR SLIDING CAR DOORS
Filed Dec. 29, 1933    2 Sheets-Sheet 1
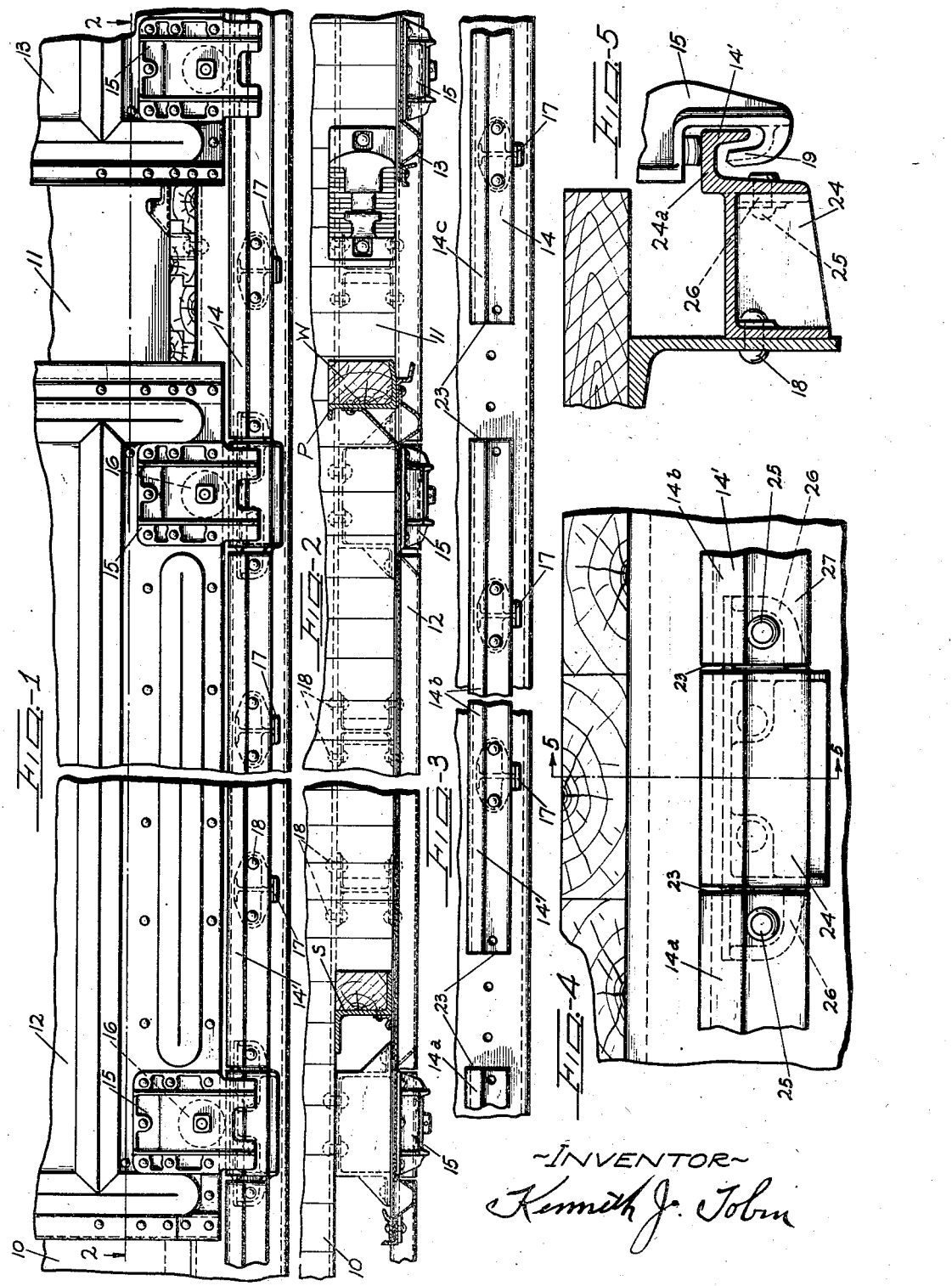
INVENTOR
Kenneth J. Tobin

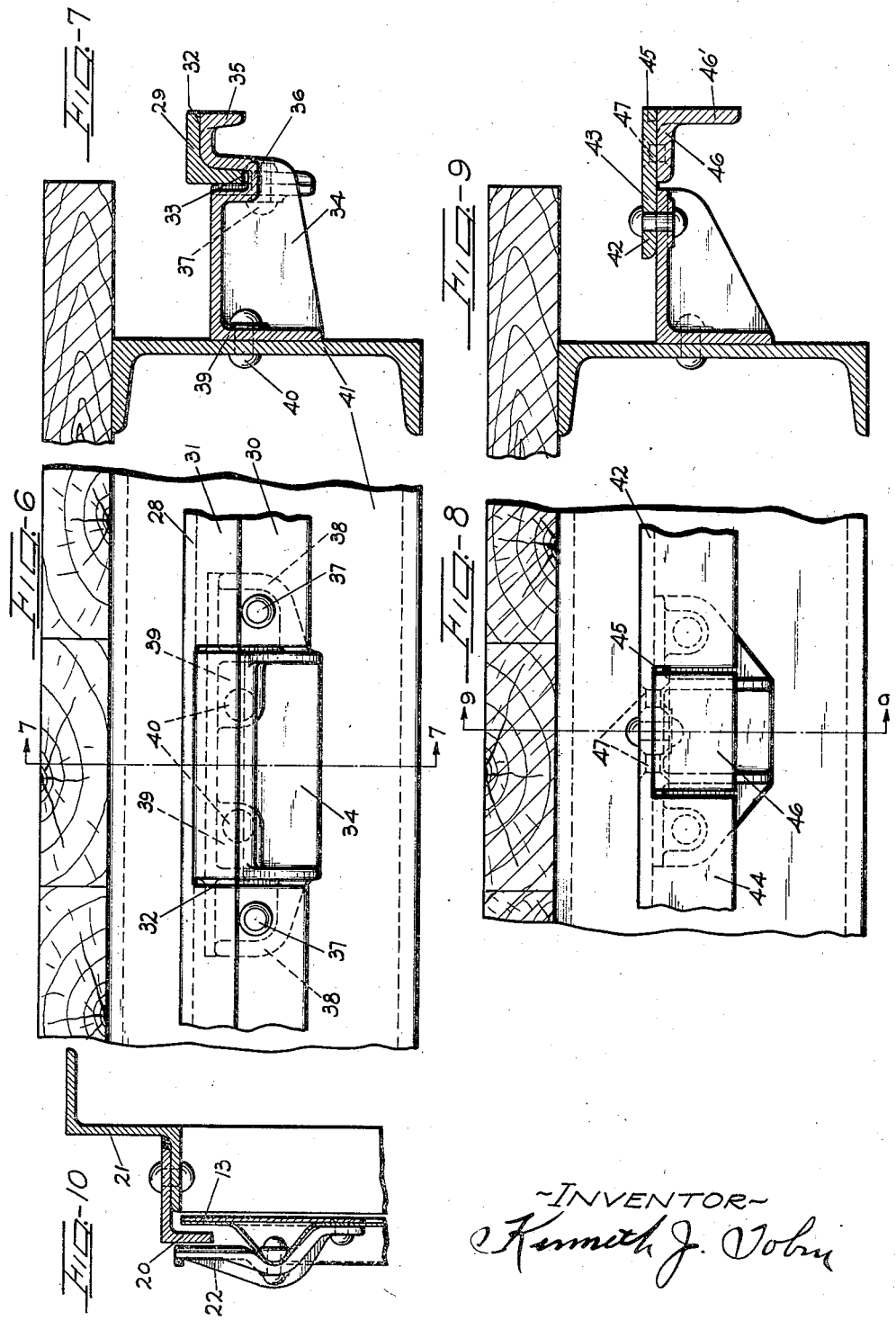

Patented Oct. 26, 1937

2,097,424

UNITED STATES PATENT OFFICE 2,097,424

TRACKS FOR SLIDING CAR DOORS

Kenneth J. Tobin, Chicago, Ill., assignor, by mesne assignments, to The Youngstown Steel Door Company, Cleveland, Ohio, a corporation of Ohio Application December 29, 1933, Serial No. 704,432

11 Claims. (Cl. 16—96)

This invention relates to tracks for sliding car doors.

Tracks for supporting house car doors for sliding movement are customarily secured upon a car underframe by means of track brackets. These brackets are in turn secured to the side sills of the underframe and support and maintain the tracks through the medium of rivets passing through the brackets and the tracks. The car door is slidably retained on the car side by the track, the top retainer, the front stops and the back stops. In addition to the above means covering single door cars, the double door car more commonly referred to as an automobile or furniture car has one of its two doors additionally secured by a post or jamb carried on the inside surface of the one door and so arranged that its opening movement is confined by the abutting of this jamb with a stationary post forming a part of the door opening and a permanent part of the car side structure. It is common practice for door manufacturers to secure this jamb permanently to one of the doors and furnish it to the car builder in this manner for application to the car.

When a door having a movable jamb as a part of it is applied to the car the door must be held up in place by a crane or other similar apparatus and the track and track brackets must be riveted in place last. There is entailed, consequently, by this mode of application, considerable expense in application and assembly. When repairs are made that necessitate the removal of the door from the car side a dozen or more track supporting brackets must be removed, the rivets cut or burnt out, the door removed, repaired and replaced in a like manner. The present invention eliminates this costly procedure and effects definite economies in construction and repairs.

It is an object of this invention to provide tracks adapted for use with sliding doors of railway house cars and to support said tracks so that certain sections of the tracks may be readily removed and replaced to facilitate door removal and repair.

A further object is the provision of tracks for sliding car doors arranged in sections and having means adapted to support the sections, and be of substantially the same cross section to maintain an unbroken continuity of the track.

A further object is the provision of a plurality of spaced track sections and other sections which have track supporting and connecting functions and which, together with the track sections, constitute a track.

Another object is to provide an arrangement whereby repairs and replacement may be made with a minimum of equipment and labor.

With these and other objects in view, which will become apparent as the description proceeds, the invention comprises the novel constructions and combinations hereinafter described and more particularly pointed out and defined in the appended claims.

In the drawings forming part of this specification—

Figure 1 is a fragmentary side elevation of a house car to which one embodiment of the invention is applied;

Figure 2 is a horizontal section taken on the line 2—2 of Figure 1;

Figure 3 is a view similar to Figure 1 except that the doors and the connecting track brackets have been removed;

Figure 4 is a fragmentary front elevational view of the track supporting and connecting track section;

Figure 5 is a vertical section taken on the line 5—5 of Figure 4, illustrating additionally the relationship between the lower portion of a door hanger and one of the track sections.

Figure 6 is a fragmentary front elevational view of a modified form of track bracket;

Figure 7 is a vertical section taken on the line 7—7 of Figure 6;

Figure 8 is a fragmentary front elevational view partly in section of a further modified form of the invention;

Figure 9 is a vertical section taken on the line 9—9 of Figure 8; and

Figure 10 is a fragmentary section through the side plate of the car illustrating the manner in which the doors are retained on the car side at the top.

Referring to the drawings there is disclosed a fragmentary portion of a railway house car 10 provided with an opening 11 of extraordinary width adapted to be closed by means of sliding doors 12 and 13, supported for movement to and from closed position upon a track 14. The door is supported for movement upon the track by means of a plurality of spaced hangers 15—15 provided with rollers 16 positioned in engagement with the track. The door 12 usually referred to as the auxiliary door is provided with a post P, carrying a post filler W, rigidly secured to the forward margin thereof on the inside surface of the door. It is apparent from the disclosure of Figure 2 of the drawings that the movable post P is in alignment with the stationary post S so that even if the customary back stops usually employed were removed it would be impossible to remove the door from the car side without further dismantling car side parts or fixtures. Supporting the track in proper position upon the car is a plurality of intermediate track brackets 17 which are secured preferably to the side sills of the car by means of rivets 18. At the bottom the door is slidably secured to the car side by the inturned lugs 19 on the hangers 15 (Figure 5) which are retained by the depending flange 14' of the track 14, and at the top (Figure 10) the door 13 is retained between the depending guide flange 20 secured to the side plate 21 and retaining brackets 22 secured to the door. With the construction described it may be readily understood from the foregoing descriptions that should the door have to be removed for repairs after its original application to the car considerable time and labor would be involved, necessitating removal of permanent car structure.

In the present invention the application of a door to the car or the removal of a door from the car is greatly simplified as I shall presently describe in the following manner.

The track indicated in its entirety by the numeral 14 may advantageously be substantially channel shaped in section, and comprises a plurality of sections 14a, 14b, 14c and 24. The sections 14a, 14b, and 14c, are secured to the car side by the intermediate brackets 17. The track sections 14a, 14b and 14c are spaced apart so as to leave gaps 23, Figures 3 and 4. The gaps 23 are adapted to be spanned or filled by the track sections 24. A portion 24a of the section 24 is of the same cross section as the track sections 14a, 14b and 14c (Figure 5) so that when secured in place similar to the manner in which intermediate track brackets 17 are secured the gap is closed and the door will have an uninterrupted path of travel over the track 14. In addition to filling the gaps 23 the track sections 24 rigidly secure the ends of the track sections 14a, 14b and 14c together by the rivets 25 passing through the lugs 26 on the track sections 24 and the flanges 27 of the track sections 14a, 14b and 14c.

By referring to Figure 1 it will be noted that the track sections are so arranged that the track sections 24 are so located that it is desirable to open the doors a distance greater than the width of the door hangers 15—15 before said hangers will register with the track sections 24 and by so doing when the doors are closed and the car loaded any shift of lading causing an outward thrust against the inside of the door will be distributed over the track sections 14b and 14c and not be borne by the track sections 24. Another benefit derived from the aforesaid arrangement results from the fact that all weather seals along the front and rear of the door are released and the door may be readily removed from the car. With the door in the position shown in Figures 1 and 2 of the drawings, removal of the track sections 24 will cause the door to be supported upon the remainder of the track from which the door may be removed by lateral movement, that is, movement in a direction transverse to the car.

In a modified embodiment of this invention illustrated in Figures 6 and 7 of the drawings, a substantially channel shaped track indicated as a whole by the numeral 28 is employed. The track 28 comprises a section which is provided with a horizontally extending portion 29 and the vertically downwardly extending flanges 30 and 31, flange 30 being preferably wider than the outwardly presented flange 31 and a plurality of sections 34. At predetermined positions the flange 31 is coped as indicated at 32 and the flange 30 is coped as indicated at 33. Each track section 34 is provided with a section 35 of the same area and contour so as to fill the coped portion 32 of the flange 31. The cope 33 in flange 30 is filled by the supporting ledge 36 of the track section 34 and secured in place by rivets 37 passing through the lugs 38 on the track section 34 and the flange 30. Other lugs 39 provided on the base of the track section 34 are secured to the side sill 41 by rivets 40 passing through the lugs 39.

Figures 8 and 9 illustrate another embodiment of the present invention wherein a substantially angle shaped track indicated as a whole by the numeral 42, supported in the usual manner by track brackets, is employed. The track 42 comprises a section having a horizontally extending portion 43 and a vertically downwardly extending flange 44 and a plurality of sections 46. At predetermined positions, the downwardly extending flange 44 is coped as indicated at 45. The track sections 46 having a downwardly extending portion 46' in alignment with the downwardly extending flange 44 are fitted into the coped out portions as illustrated and are secured to the portion 43 by means of rivets 47 passing through the horizontally extending portion 43 that the lugs 19 on the hangers 15 may be prevented from unauthorized removal.

Numerous changes and modifications of the invention will be apparent to those skilled in the art. It is intended, therefore, that all such modifications be comprehended within this invention which is to be limited only by the scope of the claims appended hereto.

I claim:

1. In a railway house car having a door opening, a track secured to said car adjacent a horizontal margin of said door opening, said track comprising a plurality of removable sections, a door slidably supported upon said track, means on said door having lateral overlapping relationship with said track, said track sections being removable from said car and said means being disposable in lateral alinement with the spaces provided by the removal of said sections, said door in said position of said means being supported upon the remainder of said track and being removable from said car by lateral disengagement from said remainder of said track, said door being also applicable to said car for support upon said remainder of said track when said sections are removed by lateral movement of said door means relative to said remainder of said track.

2. In a railway house car having a door opening, a track secured to said car adjacent a horizontal margin of said door opening, said track comprising a plurality of spaced removable sections substantially shorter than said track, a door slidably supported upon said track, means on said door of a length not in excess of that of said removable sections having lateral overlapping engagement with said track, said track sections being removable from said car and said means being disposable in lateral alinement with the spaces provided by the removal of said sections, said door in said position of said means being supported upon the remainder of said track and being removable from said car by lateral disengagement from said remainder of said track, said door being also applicable to said car for support upon the remainder of said track when said sections are removed by lateral movement of said door means relative to the remainder of said track.

3. In a railway house car, a track comprising a plurality of sections spaced longitudinally of said car, each of said sections comprising an inner vertical attaching flange, a horizontal tread and an outer vertical flange, the treads of said sections being horizontally alined and other track sections comprising integral attaching and track forming portions, said track forming portions having a cross section corresponding to that of said first mentioned sections and disposed in the spaces provided by said sections, the treads and outer vertical flanges of said track forming portions extending between and in alinement with said first mentioned treads and outer vertical flanges, and means integral with and extending from the inner vertical flanges of said track forming portions adapted to be secured to the inner vertical flanges of said first mentioned sections.

4. A track for sliding doors, comprising a plurality of connected sections, certain of said sections embodying an inner attaching flange, an intermediate portion provided with an upwardly opening recess and an outer downwardly depending flange and another of said track sections having an inner vertical leg disposed in said recess, an intermediate tread and an outer downwardly depending leg, said latter leg being coped at predetermined intervals and said downwardly depending flange being disposed in said intervals in horizontal alinement with the remainder of said depending leg, whereby upon removal of said certain track sections a door may be removed from or applied to said track by lateral movement relative to said track.

5. A track for sliding doors, comprising a plurality of connected sections, certain of said sections embodying an inner attaching flange, an intermediate portion and an outer downwardly depending flange and another of said track sections having an inner vertical leg, an intermediate tread and an outer downwardly depending leg, said latter leg being coped at predetermined intervals and said downwardly depending flange being disposed in said intervals in horizontal alinement with the remainder of said depending leg, whereby upon removal of said certain track sections a door may be removed from or applied to said track by lateral movement relative to said track.

6. A track for sliding doors comprising a plurality of connected sections, certain of said sections embodying an inner attaching flange, an intermediate portion and an outer downwardly depending flange and another of said track sections having an inner vertical leg, an intermediate tread and an outer downwardly depending leg, said latter leg being coped at predetermined intervals, said downwardly depending flange being disposed in said intervals in horizontal alinement with the remainder of said depending leg and said intermediate portion of said certain sections being disposed to support said tread for the purpose set forth.

7. A track for sliding car doors comprising a plurality of sections, one of said sections having a horizontal tread and an outer downwardly depending leg, portions of said leg being removed at predetermined intervals to provide gaps and other of said sections comprising angular members embodying a downwardly depending flange of a length substantially equal to that of the gaps provided in said leg, said angular members being secured to said first mentioned sections and disposed with said flange in said gaps in horizontal alinement with the remainder of said leg.

8. In a railway house car having a door opening, in combination, a continuous track having a plurality of sections, said track being secured to said car adjacent a horizontal margin of the door opening, a door supported upon said track by means of roller fixtures secured to said door adjacent a horizontal margin thereof, said fixtures having downwardly extending hook-shaped lugs adapted to engage a downwardly extending flange on said track to slidably retain and support said door, certain sections of said track being removable while said door is on said track, whereby when said latter sections are removed and the hook-shaped lugs of said fixtures are in the spaces formerly occupied by said removable track sections, said door will be supported upon the remaining sections of said track and be movable laterally therefrom for removal from said car.

9. In a railway house car having a door opening, in combination, a continuous track having a plurality of sections secured to said car adjacent a horizontal margin of the door opening, a door supported upon said track by means of roller fixtures, portions of which have interlapping engagement with said track, said track having sections thereof which are removable, said removable sections being arranged approximately the same distance apart as the roller housings and being of approximately the same width, said latter sections being removable to provide spaces, and said door being disposed with said portions of said roller fixtures in lateral alinement with said spaces, said door in said position being supported upon the remaining sections of said track and being movable laterally therefrom for removal from said car.

10. In a railway car having a door opening, and a sliding door provided with sealing strips along the vertical margins thereof for lateral overlapping engagement with vertical sealing strips secured to the car adjacent the door opening, a track comprising a plurality of removable and fixed sections secured to said car adjacent a horizontal margin of said door opening for supporting said door, means on said door having lateral over-lapping relationship with said track, said first-mentioned track sections being removable from said car to provide spaces and said means being disposable in lateral alinement with said spaces, the sealing strips being disengaged in said position of said means, said door in said position of said means being supported upon the fixed track sections and being removable from said car by lateral disengagement from said fixed sections.

11. In a railway car having a door opening, and a sliding door provided with an inwardly extending post secured to the front vertical margin thereof disposed in longitudinal alinement with the rear edge of said door opening, a track comprising a plurality of removable and fixed sections secured to said car adjacent a horizontal margin of said door opening for supporting said door, the alinement of said door post and said rear edge of the door opening preventing longitudinal disengagement of said door from said track and car, means on said door having lateral overlapping relationship with said track, said first-mentioned track sections being removable from said car to provide spaces, and said means being disposable in lateral alinement with said spaces, said door in said position of said means being supported upon the fixed track sections and being removable from said car by lateral disengagement from said fixed sections.

KENNETH J. TOBIN.